Oct. 13, 1953
A. MAGNANI
2,655,196
METHOD AND MACHINE FOR MANUFACTURING
CORRUGATED FIBROCEMENT SLABS
Filed June 1, 1951
3 Sheets-Sheet 1
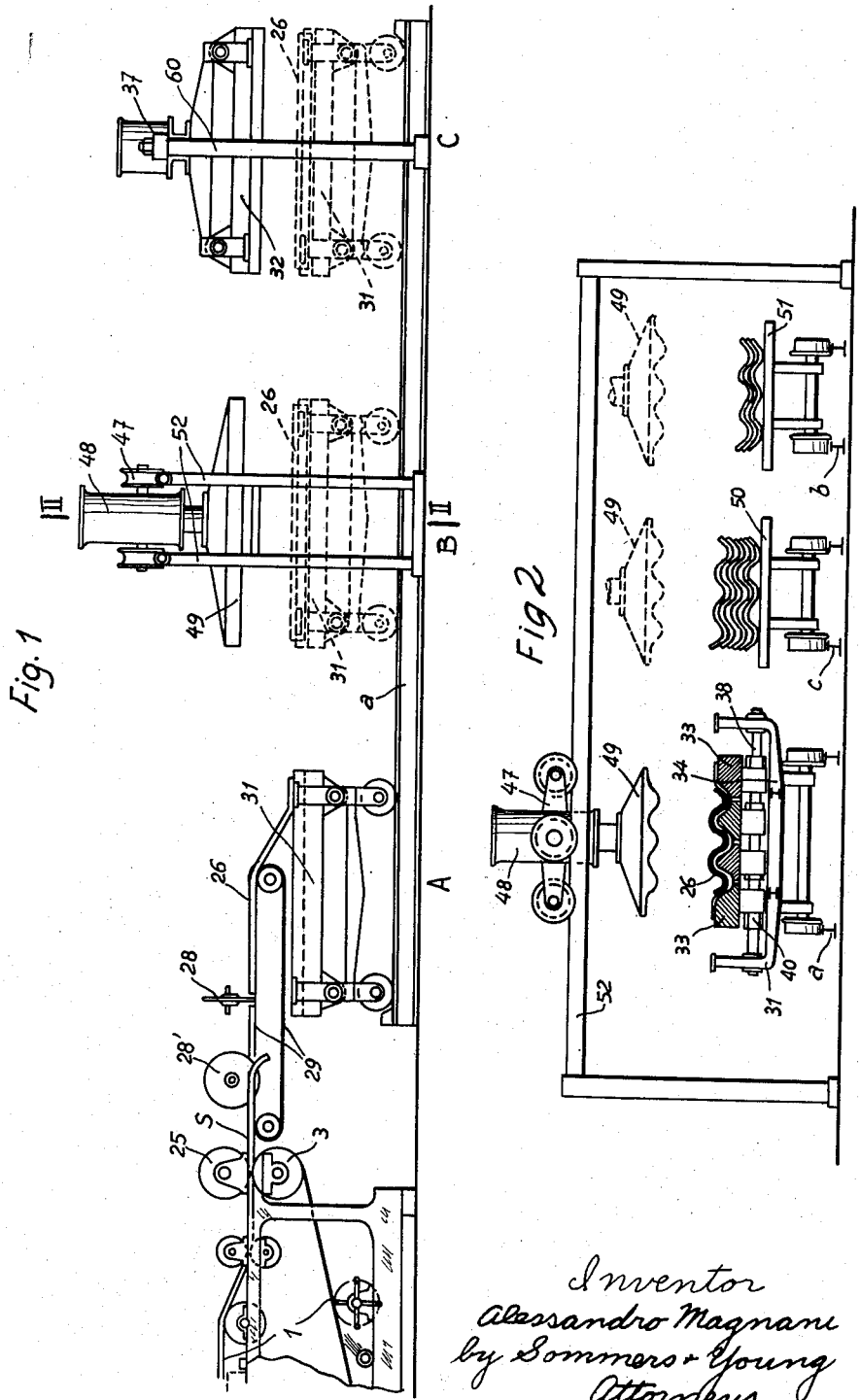
Inventor
Alessandro Magnani
by Sommers + Young
Attorneys

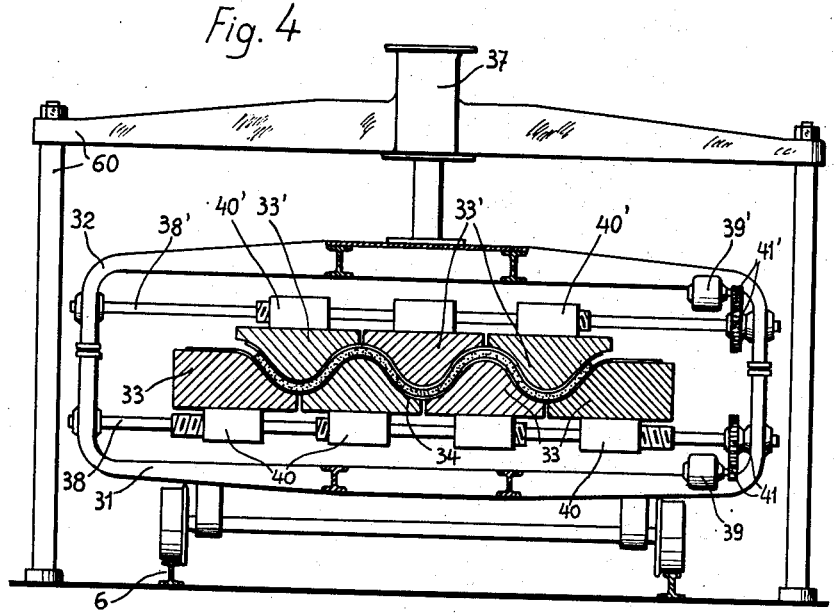
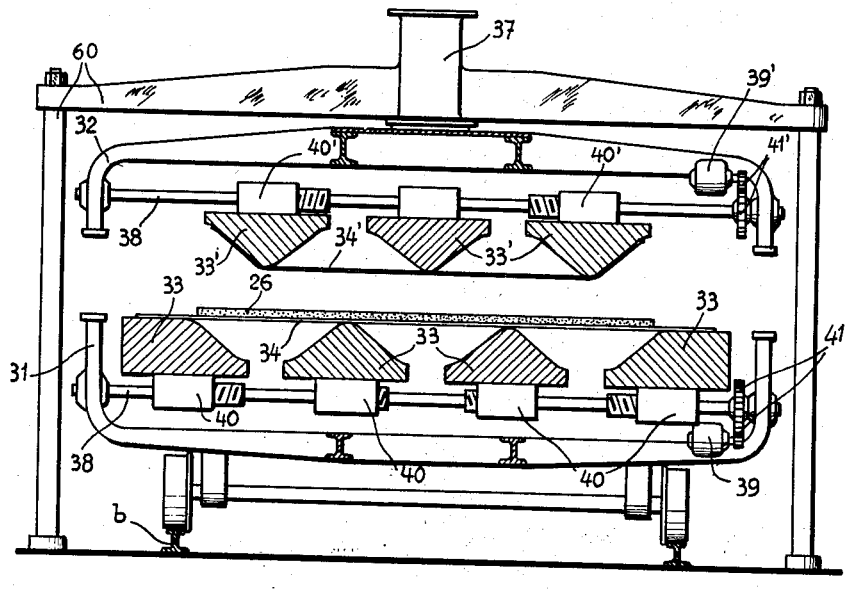

Oct. 13, 1953

A. MAGNANI 2,655,196

METHOD AND MACHINE FOR MANUFACTURING
CORRUGATED FIBROCEMENT SLABS

Filed June 1, 1951

Inventor
Alessandro Magnani
by Sommers & Young
Attorneys

Patented Oct. 13, 1953

2,655,196

UNITED STATES PATENT OFFICE 2,655,196

METHOD AND MACHINE FOR MANUFACTURING CORRUGATED FIBROCEMENT SLABS

Alessandro Magnani, Broni, Italy

Application June 1, 1951, Serial No. 229,414
In Italy September 20, 1950

12 Claims. (Cl. 154—30)

This invention relates to a method of manufacturing corrugated fibrocement slabs from fresh flat slabs, and to a machine for carrying out said method.

The flat fibro-cement slabs may be manufactured by any suitable method to be combined with my improved method, for instance by the method disclosed by my copending application Ser. No. 229,416 filed June 1, 1951, by which I manufacture an endless sheet which is trimmed and cut for forming flat slabs of sufficient flexibility, which may be moulded for manufacturing corrugated slabs by my improved method.

For this purpose each flat slab is arranged between two flexible sheets and the resulting unit is moulded between longitudinal elements each having a shaped surface adapted to produce the corrugations in association with similar elements situated on the opposite side.

The elements situated on the two sides of the slab, are initially in spaced relationship and from this position they are gradually drawn together by moving the top elements towards the lower elements on which the slab rests, keeping constantly staggered till they intermesh conferring to the interposed slab the desired corrugated shape.

According to this invention the two flexible sheets are each anchored to the end elements of the corresponding set of elements having a shaped surface, in order to be stretched when the elements are most spaced at the molding starting. The sheets are of rubber or other elastic material and have fixed thereto on both sides in staggered relationship bands of canvas or other practically non-extensible and flexible material. The bands of canvas which on moulding are external, are situated on each belt at the convex slab portions, while the inner bands are at the concavities of the slab, the edges of the outer and inner bands overlapping each other by a certain extent.

Further details of the invention, such as those concerning the machine, shall be described with reference to the accompanying drawings which show the method and diagrammatically illustrate the machine for carrying it out.

Figure 1 is a diagram of the method of manufacturing corrugated slabs from an endless sheet manufactured in any suitable manner;

Figure 2 is a section on line II—II of Figure 1;

Figures 3 and 4 show in the initial and end position of the process the apparatus for moulding corrugated slabs from flat slabs;

Figure 5:
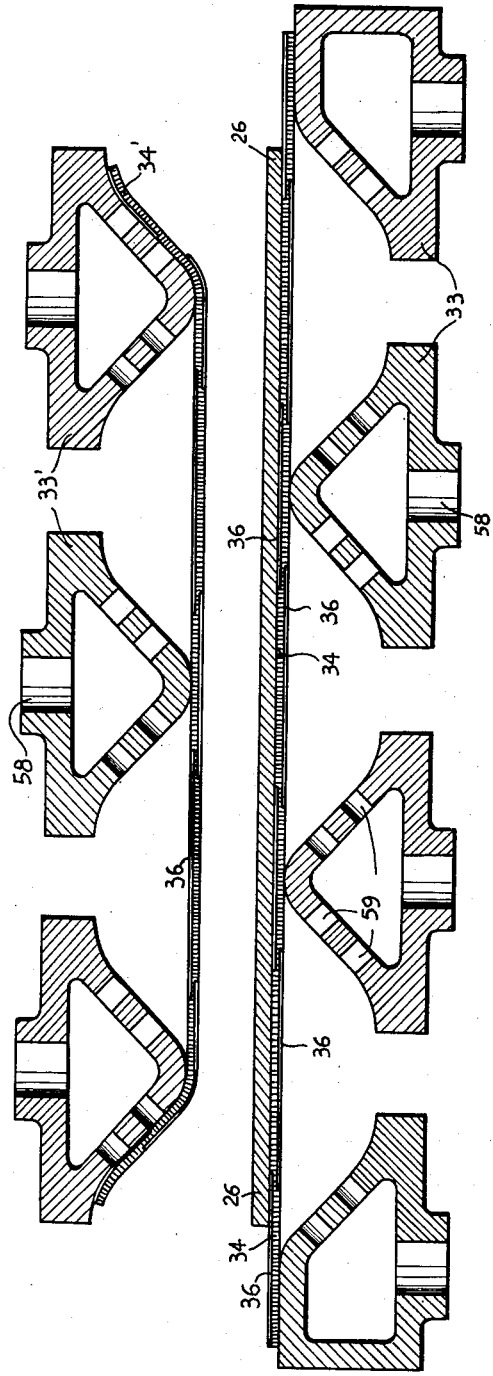
Figures 5 and 6 show a detail of said apparatus and a modification of the sheets clamping the slab to be moulded.

Referring to Figure 1 of the drawings, I denotes an endless belt, stretched between two rollers of which the drawing shows the rear one 3, on this belt an endless sheet S of fibrocement of suitable thickness is formed by any desired method.

The sheet, which is dephlegmated and compressed as described in my copending application, is further compressed, if necessary, between the end roller 3 and an overlying roller 25 and is caused to travel over a further conveying belt 29. On the latter the endless sheet is cut by rotary cutters 28, 28' or other known means, on its side edges and transversely for trimming it and forming the slabs.

The cutter 28 which cuts the sheet transversely, performs at the same time a longitudinal movement in the same direction as the slab and at the same rate of speed as the latter.

The corrugated slabs are formed in the following manner, Figures 1 and 2;

The flat slab 26 carried by the belt 29 which may perform an intermittent motion is fed on the underlying carriage 31, the movement of which is synchronized with that of the belt 29.

The carriage 31 is brought from the position A to the position C, Figure 1, by moving it on its rail $a$ till it comes under the moulding press, of which 60 denotes the frame. The press is provided with a movable equipment 32 that shall be described hereafter, cooperating with the equipment of the carriage 31 during the moulding step.

After moulding the corrugations, the carriage 31 is brought from the position C to the position B, Figure 1, where a crane bridge 52 is arranged across the rail. The carriage 47 of the crane supports the ram 48, the piston of which actuates the suction hoist 49. By means of the suction hoist 49 of suitable corrugated shape, Fig. 2, the moulded slab is removed from the carriage 31 and brought onto the carriage 50 arranged on a rail $c$ parallel with the rail $a$.

A further carriage 51 is providd for supplying corrugated moulds for interposing between the fresh corrugated slabs as they are moulded.

For moulding in the press 60 the equipment carried by the carriage 31 is employed in association with the equipment carried by the movable portion 32 of the press 60.

These equipments comprise a plurality of elements 33, 33', respectively, each matching the profile of a corrugation in the slab, Figures 3 to 6.

The elements 33, as well as the elements 33', may be drawn together to a spaced relationship equalling the pitch of the slab corrugations.

A band of flexible material 34, 34' respectively is placed on the elements 33, 33', which is fixed to the outer elements and is tangential to the crests of the intermediate ones, Figures 3 and 5.

A slab 26 is placed on the band 34 in the manner described.

The elements 33' of the equipment 32 are in a position intermediate with respect to the underlying elements of the equipment of the carriage 31, Figures 3 and 4, said position being maintained as they are drawn towards each other.

When the carriage 31, carrying the fibrocement slabs 26 to be moulded, is brought to the position C on the rail $a$ under the press 60, the movable equipment 32 is lowered by means of the ram 37, so that the slab is clamped between the flexible bands 34, 34'.

The elements 33' are then moved vertically and perform at the same time a horizontal movement synchronous with the likewise horizontal movement transmitted to the elements 33, so that the axes of the elements 33' as the latter are drawn towards the elements 33, constantly remain on the middle line with respect to the axes of the elements 33 till the elements fully intermesh as indicated in Figure 4.

During this movement the slab 26 is corrugated while it constantly adheres to the upper and lower surface of the flexible bands 34, 34' respectively, avoiding any risk of cracks, even if the slab is highly compressed and dry.

When moulding is completed, the equipment 32 of the press 60 is lifted and the carriage 31 is moved on the rail $a$ to the position B, Figure 1.

The suction hoist 49, Figure 2, of which the gripping surface is suitably corrugated, lifts by means of the ram 48 the moulded slab and places it on the carriage 50 of the rail $c$, whence the slab is removed for seasoning.

The carriage 31 is returned to the position A and the elements 33, 33' resume their maximum spaced relationship.

The unit is now ready for performing a cycle similar to the one just described. Meanwhile a corrugated mold is placed on the carriage 50 from the carriage 51 on the rail $b$ by means of the lifter 49.

These steps may be performed automatically by providing a suitable interdependence through mechanical means or electric circuits.

In order to improve the action of the two flexible bands 34, 34' on the slab during molding of the latter, the bands are made, according to this invention, of elastic material, such as india rubber, and may therefore be resiliently elongated when subjected to traction.

The bands are resiliently elongated when the elements 33, 33' are in their inoperative position in an increased spaced relationship for the purpose of producing said elongation, Figure 3. In this manner, during moulding of the slab the two elastic bands are reduced in length by the same extent by which they have been elastically elongated and thereby draw together in a transverse direction the particles of which the slab is made, avoiding the danger of cracks in the slab.

On examining the behaviour of an asbestos-cement slab during molding for corrugating it by the known methods, the tendency to crack of the convex portions of the corrugations, where the fibres are drawn apart, will be easily ascertained, while the concave portions do not show any tendency to crack, because the fibres have been drawn together.

According to this invention, the drawing apart of the fibres at the convex portions of the corrugations may be avoided and the drawing together of the fibres at the concave portions of the corrugations may be improved. For this purpose, the two bands 34, 34' are such that during molding of the slab the regions in contact with the convex portions of the corrugations contract drawing together the slab fibres, while the regions in contact with the concave portions remain of constant length.

Figure 6:
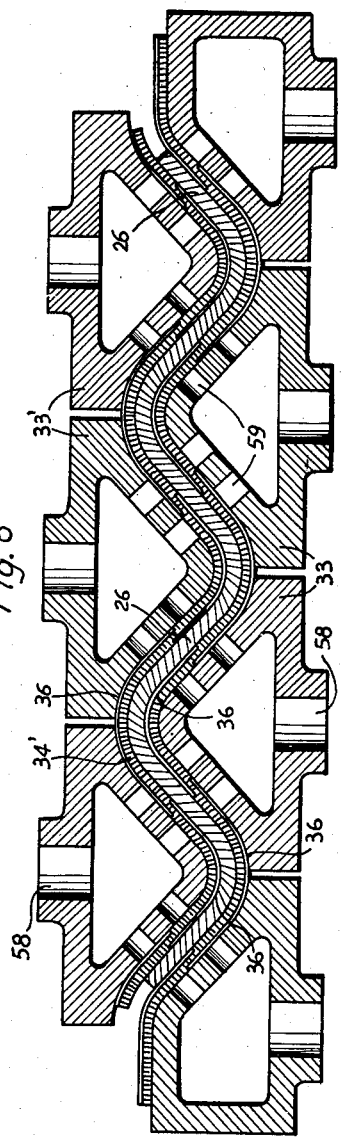

This may be obtained, Figures 5 and 6, by applying strips of canvas or other practically inextensible and flexible material to both faces of each rubber band 34, 34'. More particularly, canvas strips 36 are applied in a longitudinal direction with respect to the slab to the outer surfaces of the bands 34—34' at the convex portions of the corrugations and to the inner surfaces at the concave portions. The canvas strips are of a width transversely of the slab such as to adequately overlap one another.

With this arrangement the bands 34, 34' produce through the non-extensible strips 36 on their back at the crests of the corrugations a concentration of the fibres of the fibro-cement layer 26 at said regions, while at the concave portions of the corrugations the canvas strips 36 in direct contact with the plate 26 afford a uniform distribution of the fibres at said regions.

Referring to Figures 5 and 6 the size across the corrugations of the surfaces of the two belts in contact with the slab at the regions not covered by canvas strip, is reduced during molding, said reduction being dependent upon the shape of the corrugations and belt thickness. The slab, being molded, undergoes this transverse reduction, whereby the slab particles are drawn together, avoiding the danger of cracks even in the case of dry material of substantial thickness.

On completion of the operation the equipment 32 is lifted and the equipment of the carriage 31 is returned to the position B for removal of the finished slab.

During these steps the band 34 carrying the slab 26, being clear of the upper equipment, might be displaced and alter the accurate slab profile.

In order to avoid this drawback, the elements 33, 33' are made hollow, Figures 5, 6, and their surface is bored with holes 59 at the region against which the band 34, 34' adheres. The elements are connected over taps 58 with a suction conduit, not shown for the sake of simplicity, when the equipment 32 has been lowered on the equipment of the carriage 31, in order to keep the belts 34—34' close to their supporting elements 33, 33'.

On removal of the slab by means of the suction hoist 49, the underpressure is removed and the steps described above are carried out.

Referring to Figures 3, 4 which show in detail the press for moulding the corrugated slabs, the shaped elements 33, 33' of the lower and upper set, respectively, which are arranged in staggered relationship, are provided on the side opposed to the corrugated surface a nut 40, 40', respectively, into which screw-threaded portions of the shafts 38, 38' are screwed, which are carried by the carriage 31 and equipment 32 of the movable member of the hydraulic press, of which 37 denotes the pressure ram.

The pitch of the screw-threaded portions of the shafts 38, 38' is greatest at the ends with respect to the middle axis of the machine and decreases towards the said axis in order to approach the elements 33, 33' in the above described manner by rotation of the shafts 38, 38' during lowering of the equipment 32 on the carriage 31. The shafts 38, 38' are rotated by motors 39, 39' over a transmission 41, 41'.

I wish it to be understood that I do not desire to be limited to the exact details of construction as described, for obvious modifications will occur to a person skilled in the art.

What I claim is:

1. In a method of manufacturing corrugated fibro-cement slabs from fresh flat slabs the combination of the steps comprising in subdividing the upper and lower mold for producing the corrugations in the freshly molded flat slab in as many longitudinal elements as there are corrugations, the profile of the cross section of said elements equalling the profile of the corrugations, arranging said elements in spaced relationship while the molds are widest apart, securing to the end elements of each of said molds a flexible band, so that when the molds are fully apart, said bands are tensioned tangentially of the crests of the corrugations of the intermediate elements, feeding the freshly molded flat slabs succesively between said bands and molding by drawing the molds toward each other and at the same time gradually drawing the elements towards the middle line of each mold, so that in the closed position the elements of a mold contact each other and intermesh between the cooperating elements of the other mold.

2. In a method of manufacturing corrugated fibro-cement slabs from fresh flat slabs the combination of the steps comprising in subdividing the upper and lower mold for producing the corrugations in the freshly molded flat slab in as many longitudinal elements as there are corrugations, the profile of the cross sections of said elements equalling the profile of the corrugations, arranging said elements in spaced relationship while the molds are widest apart, securing to the end elements of each of said molds a rubber band so that, when the molds are widest apart, said bands are tensioned tangentially of the crests of the corrugations of the intermediate elements and undergo a predetermined elongation, feeding the freshly molded flat slabs successively between said bands and molding by drawing the molds close to each other and at the same time gradually drawing the elements towards the middle line of each mold, so that the bands on contracting cause the slab fibres to draw nearer to one another during corrugating, the elements of one mold coming into contact with each other and engaging with the elements of the other mold in the closed position.

3. Method as claimed in claim 2, wherein the flexible bands are kept close to the mold surfaces by suction through said elements during molding and are removed from said surfaces at the end of molding by blowing air on the surface of the bands in contact with the molds.

4. Apparatus for manufacturing corrugated slabs from freshly molded flat slabs, comprising in combination a machine for manufacturing flat slabs, a press, a mold carried by the movable element of said press and composed of longitudinal elements of which the cross sectional profile equals one corrugation, a carriage carrying a second mold composed of longitudinal elements equalling in profile one corrugation, a belt conveyor at the outlet end of the machine for manufacturing flat slabs and a rail for conveying the carriage from said conveyor underneath the press in such position that the elements of one mold are staggered with respect to those of the other mold and means for lowering the press mold down on the carriage mold, so as to mold the corrugations in the fibro-cement slab.

5. Apparatus as claimed in claim 7, wherein the molds carried by the carriage and press, respectively, each comprise a plurality of longitudinal elements matching in profile one corrugation, means for removing said elements from one another so that they become symmetrically equidistant with respect to the mold axis when the molds are in their open position, means for drawing a mold close to the other synchronized with the first mentioned means, so that, when the molds reach their closed position, the elements of each mold are close to the adjacent elements, the elements of a mold being staggered with respect to the elements of the other mold.

6. Apparatus as claimed in claim 7, wherein the molds carried by the carriage and press, respectively, each comprise a plurality of longitudinal elements each matching in profile one corrugation, means for laterally displacing said elements with respect to one another so that they become symmetrically equidistant with respect to the longitudinal axis of the mold, a band of flexible material secured to the end elements of each mold and of a length such that, when the molds are widest apart, the band is tensioned tangentially of the crest of the intermediate elements, means for feeding a freshly molded flat slab between said stretched bands and means for drawing a mold close to the other synchronized with the first mentioned means, so that, when the molds reach their closed position, the elements of each mold come into contact with each other and engage with the elements of the other mold.

7. Apparatus for manufacturing corrugated slabs from freshly molded flat slabs comprising in combination a machine for manufacturing flat slabs a press having a movable equipment, a mold carried by said movable equipment and composed of longitudinal elements matching in profile one corrugation, a carriage carrying a second mold composed of longitudinal elements equalling in profile one corrugation, means for displacing the elements of said molds laterally of one another so that they become symmetrically equidistant with respect to the longitudinal mold axis, a band of flexible material secured to the end elements of each mold and of a length such that, when the molds are widest apart, the band is tensioned tangentially of the crests of the intermediate elements, means for feeding a freshly molded flat slab on the band of the mold on the carriage, a rail for conveying the carriage from said conveyor underneath the press in a position such that the mold elements on the carriage are staggered to the elements of the mold carried by said movable equipment, means for lowering the mold carried by said movable equipment on the carriage mold and means synchronised with the control means for said movable equipment for drawing the elements of each mold close to one another in such manner that, when the molds reach their closed position, the closed elements of one mold engage the closed elements of the other mold for corrugating the freshly molded slab, a crane between the machine for manufacturing flat slabs and said press, a suction hoist carried by the crane carriage for lifting the corrugated slab from the mold carriage, a second rail arranged parallel with the first-mentioned rail, a carriage movable on said second rail and adapted to receive the corrugated slab conveyed by the suction hoist to transport it to seasoning.

8. Apparatus for manufacturing corrugated slabs from freshly molded flat slabs comprising in combination a machine for manufacturing flat slabs a press having a movable equipment, a mold carried by said movable equipment and composed of longitudinal elements matching in profile one corrugation, a carriage carrying a second mold composed of longitudinal elements equalling in profile one corrugation, means for displacing the elements of said molds laterally of one another so that they become symmetrically equidistant with respect to the longitudinal mold axis, a band of flexible material secured to the end elements of each mold and of a length such that, when the molds are widest apart, the band is tensioned tangentially of the crests of the intermediate elements, means for feeding a freshly molded flat slab on the band of the mold on the carriage, a rail for conveying the carriage from said conveyor underneath the press in a position such that the mold elements on the carriage are staggered to the elements of the mold carried by said movable equipment, means for lowering the mold carried by said movable equipment on the carriage mold and means synchronised with the control means for said movable equipment for drawing the elements of each mold close to one another in such manner that, when the molds reach their closed position, the closed elements of one mold engage the closed elements of the other mold for corrugating the freshly molded slab, a crane between the machine for manufacturing flat slabs and said press, a suction hoist carried by the crane carriage for lifting the corrugated slab from the mold carriage, a second rail arranged parallel with the first mentioned rail, a carriage movable on said second rail and adapted to receive the corrugated slab conveyed by the crane, a third rail arranged parallel with said first mentioned rails, a third carriage on said third rail carrying corrugated molds, said suction hoist gripping a corrugated mold for inserting it between the freshly molded corrugated slabs on said second carriage for conveying them to seasoning.

9. Machine as claimed in claim 8, in which the endless band feeding the freshly molded flat slabs to the mold carriage is actuated at two different speeds, of which one is proportioned to the manufacturing rate of flat slabs, and the other considerably higher speed equals the feed rate of the carriage during transfer of the slab on said carriage.

10. Apparatus as claimed in claim 7, comprising moreover a rubber band secured to the end elements of each mold which, when the elements are widest apart in the open mold position, is tensioned tangentially of the crest of the intermediate elements, so that the bands fit the corrugations in the molds approaching the fibres to one another at the convex regions of the fresh molded band.

11. Apparatus for manufacturing corrugated slabs from fresh flat slabs comprising in combination a machine for manufacturing flat slabs, a press, a mold carried by the movable equipment of said press and made up of longitudinal elements equalling in profile one corrugation, a carriage carrying a second mold constituted by longitudinal elements equalling in profile one corrugation, means for laterally displacing said elements with respect to one another so that they become symmetrically equidistant with respect to the longitudinal mold axis, a rubber band secured to the end elements of each mold and of a length such that, when the elements are widest apart, it is tensioned tangentially of the crests of the intermediate element, strips of inextensible flexible material applied in a staggered relationship on both band faces, the strips on the outer band face registering with the convexities of the corrugations, while the strips on the inner band face register with the concavities of the corrugations, means for drawing one mold close to the other synchronized with the control means for the elements, so that, when the molds reach their closed position, the closed elements of one mold engage with the closed elements of the other mold and the bands suit the corrugations of the molds resuming their primitive length, so as to exert on the convex portions of the freshly molded slab an action drawing the fibres nearer to one another, a band conveyor at the outlet end of the machine for manufacturing flat slabs and a track for conveying the carriage from said conveyor underneath the press to a position such that the elements of one mold are staggered with respect to those of the other mold and means for lowering the press mold on the carriage mold in order to mold the corrugations on the fibro-cement slab.

12. Apparatus for manufacturing corrugated slabs from fresh slabs as claimed in claim 11, in which the elements are hollow and bored in their shaped walls and comprising moreover means for exerting during molding a suction on the bands through the hollow elements, in order to cause the bands to suit the corrugations of the molds, the bands being removed from the elements on completion of molding by blowing air through the hollow elements so as to facilitate release of the bands during opening of the molds.

ALESSANDRO MAGNANI.

References Cited in the file of this patent

UNITED STATES PATENTS

| Number | Name | Date |
|---|---|---|
| 1,587,462 | Adams et al. | June 1, 1926 |
| 2,276,083 | Moeller | Mar. 10, 1942 |
| 2,481,049 | Stamm et al. | Sept. 6, 1949 |

FOREIGN PATENTS

| Number | Country | Date |
|---|---|---|
| 329,262 | France | May 25, 1903 |
| 506,487 | France | May 29, 1920 |
| 264,853 | Switzerland | Feb. 1, 1950 |